(12) United States Patent
Nguyen et al.

(10) Patent No.: US 9,896,619 B2
(45) Date of Patent: Feb. 20, 2018

(54) ENHANCING CONDUCTIVITY OF MICROFRACTURES

(71) Applicant: Halliburton Energy Services, Inc., Houston, TX (US)

(72) Inventors: Philip D. Nguyen, Houston, TX (US); Vladimir Nikolayevich Martysevich, Spring, TX (US); Jessica Lynn Heeter, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 14/963,036

(22) Filed: Dec. 8, 2015

(65) Prior Publication Data

US 2017/0158952 A1    Jun. 8, 2017

(51) Int. Cl.
   *E21B 43/26*   (2006.01)
   *C09K 8/80*    (2006.01)
   *E21B 43/267*  (2006.01)
   *C09K 8/68*    (2006.01)

(52) U.S. Cl.
   CPC .............. *C09K 8/80* (2013.01); *C09K 8/685* (2013.01); *E21B 43/26* (2013.01); *E21B 43/267* (2013.01); *C09K 2208/04* (2013.01); *C09K 2208/26* (2013.01)

(58) Field of Classification Search
   CPC ....... E21B 43/26; E21B 43/261; E21B 43/267
   USPC ..................... 166/308.1, 308.2, 308.3, 308.5
   See application file for complete search history.

(56) References Cited

U.S. PATENT DOCUMENTS

| | | | | |
|---|---|---|---|---|
| 4,051,900 A | * | 10/1977 | Hankins | C09K 8/80 166/278 |
| 4,078,609 A | * | 3/1978 | Pavlich | E21B 33/138 166/271 |
| 7,210,528 B1 | * | 5/2007 | Brannon | C09K 8/62 507/140 |
| 7,213,651 B2 | * | 5/2007 | Brannon | C09K 8/62 166/177.5 |
| 8,082,994 B2 | | 12/2011 | Nguyen et al. | |
| 8,607,870 B2 | * | 12/2013 | Gu | E21B 43/26 166/280.1 |
| 8,613,314 B2 | | 12/2013 | Garcia-Lopez De Victoria et al. | |
| 8,985,213 B2 | | 3/2015 | Saini et al. | |
| 9,790,774 B2 | * | 10/2017 | Nguyen | C09K 8/62 |

(Continued)

OTHER PUBLICATIONS

Transactions of the ASME 126, Influence of Fluid Viscosity on the Hydraulic Fracturing Mechanism, Ishida, et al. Sep. 2004.

(Continued)

*Primary Examiner* — Angela M DiTrani
(74) *Attorney, Agent, or Firm* — McAfee & Taft

(57) ABSTRACT

A method of fracturing a subterranean formation and forming a fracture network therein that includes at least one primary fracture and at least one microfracture is provided. A plurality of micro-proppant particulates is mixed with the fracturing fluid and placed in the microfracture, and a plurality of primary proppant particulates are mixed with the fracturing fluid and placed in the primary fracture. The step of mixing the micro-proppant particulates with the fracturing fluid continues for so long as the primary proppant particulates are mixed with the fracturing fluid and the fracturing fluid and primary proppant particulates are pumped into the formation.

22 Claims, 4 Drawing Sheets

(56) References Cited

U.S. PATENT DOCUMENTS

2008/0280788 A1* 11/2008 Parris .................... C09K 8/685
                                                          507/211
2008/0280790 A1* 11/2008 Mirakyan ................ C09K 8/12
                                                          507/237
2013/0284437 A1* 10/2013 Nguyen ................ E21B 43/267
                                                          166/280.1
2014/0299318 A1    10/2014 Crews et al.

OTHER PUBLICATIONS

Journal of Natural Gas Science and Engineering, Opening of Natural Fracture and its Effect on Leakoff Behavior in Fractured Gas Reservoirs, Guo, et al., 2014.
SPE 59419, Experimental Hydraulic Fracture Propagation in a Multi-Fractured Medium, Beugelsdijk, et al., 2000.

* cited by examiner

ENHANCING CONDUCTIVITY OF MICROFRACTURES

BACKGROUND

In order to efficiently produce hydrocarbons from a subterranean formation, the formation must be sufficiently conductive in order to allow the hydrocarbons to flow to the wellbore. Various treatments for increasing the conductivity of a subterranean formation have been developed.

One technique for increasing the conductivity of a subterranean formation and thereby stimulating production of hydrocarbons from the formation is hydraulic fracturing. Hydraulic fracturing generally involves pumping one or more treatment fluids into the formation at a sufficient hydraulic pressure to create or enhance one or more fractures in the formation. Typically, a pad fluid that does not contain any proppant particulates is first injected into the formation to initially fracture the formation. Following injection of the pad fluid, a proppant slurry that includes a plurality of proppant particulates is injected into the formation. The proppant slurry deposits the proppant particulates in the fracture and any branches thereof in order to prevent the fracture and the fracture branches from fully closing once the hydraulic pressure from the fluid is released and the fracturing operation is complete. The resulting "propped fracture" provides a conductive channel through which fluids in the formation can flow to the wellbore. As used herein and in the appended claims, the term "propped fracture" means a fracture (naturally-occurring or otherwise) in a subterranean formation that contains a plurality of proppant particulates.

Fracturing tight formations of unconventional reservoirs, such as formations containing shale, tight sandstone formations and coal bed formations, requires special considerations. For example, shale, coal and other types of formations can have a permeability of approximately 1 millidarcy (mD) or less. Hydraulically fracturing such formations typically forms a complex fracture network that includes primary fractures (and branches thereof) and microfractures (including natural microfractures and induced secondary microfractures) in a zone of the formation surrounding the wellbore.

For example, the microfractures can extend from a tip and edges of a primary fracture or a branch thereof and extend outwardly in a branching tree-like manner from the primary fracture. The microfractures can extend transversely to the trajectory of the primary fractures allowing them to reach and link natural fracture both in and adjacent to the trajectory of the primary fractures. The microfractures can exist and be formed in both near-wellbore and far-field regions of the zone, as well as regions located adjacent to primary fracture branches. As a result, the microfractures can give more depth and breadth to the fracture network.

In the absence of proppant particulates, the microfractures tend to close back once the hydraulic pressure placed on the formation is released or decreased. Conventional or traditional proppant particulates are often too large to prop the microfractures open. As a result, due to their size, conventional proppant particulates cannot be easily placed in microfractures. Allowing the microfractures to close cuts off a significant portion of the fracture network and ultimately prevents the production of valuable hydrocarbons therefrom.

In order to address this issue, micro-proppant particulates having a size sufficient to allow the particulates to be placed in microfractures have been developed. The micro-proppant particulates are included in the pad fluid stages of the fracturing treatment. Including micro-proppant particulates in the pad fluid places the micro-proppant particulates in the fissure openings to and otherwise in the microfractures as soon as they are opened or created. By holding the microfractures open, the micro-proppant particulates help maintain fluid communication between the microfractures and the primary fractures. Conventional proppant particulates are then included in the proppant-slurry stages of the fracturing treatment and placed in the primary fractures and branches to help ensure that fluid conductive flow paths to the wellbore are maintained.

During the injection of the proppant slurry stages and even after the hydraulic pressure on the formation is released and the fractures are allowed to close on top of the proppant particulates, the base fracturing fluid continues to leak off into the complex fracture network as a whole including the opened and/or created microfractures in the network. Unfortunately, such leak off can displace the micro-proppant particulates away from the fissure openings of and deep into the microfractures. This can cut off communication of the microfractures with the overall fracture network and defeat or partially defeat the purpose of placing micro-proppant particulates in the microfractures in the first place. In tight formation where microfractures are prevalent, the inability to keep the microfractures open can significantly reduce the potential amount of hydrocarbons that can be recovered from the formation.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
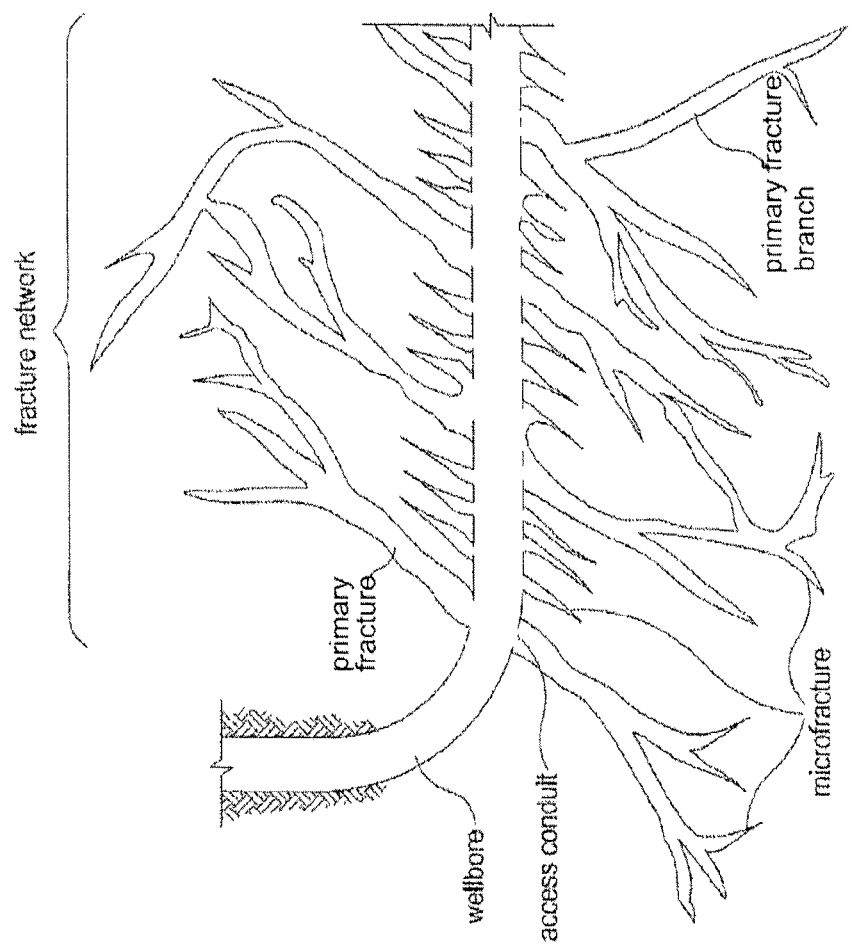
FIG. 1 illustrates a non-limiting example of a dendritic fracture network extending from a wellbore into a subterranean formation.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure.

In accordance with this disclosure, a method of fracturing a subterranean formation is provided. The method comprises the following steps:

(a) providing a fracturing fluid, the fracturing fluid including a base carrier fluid;

(b) pumping the fracturing fluid into the subterranean formation at a pressure above the fracture gradient of the formation to fracture the formation and form a fracture network therein that includes at least one primary fracture and at least one microfracture;

(c) mixing a plurality of micro-proppant particulates with the fracturing fluid and placing micro-proppant particulates in the microfracture;

(d) mixing a plurality of primary proppant particulates with the fracturing fluid and placing primary proppant particulates in said primary fracture, wherein the step of mixing the micro-proppant particulates with the fracturing fluid is initiated at a point before or after the fracturing fluid is first pumped into the formation and continues for so long as the primary proppant particulates are mixed with the fracturing fluid and the fracturing fluid and primary proppant particulates are pumped into the formation; and (e) ceasing pumping of the fracturing fluid into the subterranean formation thereby causing the pressure at which the fracturing fluid is pumped into the formation to fall below the fracture gradient of the formation.

In one embodiment, the method disclosed herein comprises the following steps:

(a) providing a pad fracturing fluid, the pad fracturing fluid including a base carrier fluid;

(b) pumping the pad fracturing fluid into the subterranean formation at a pressure above the fracture gradient of the formation to fracture the formation and form a fracture network therein that includes at least one primary fracture and at least one microfracture;

(c) mixing a plurality of micro-proppant particulates with the pad fracturing fluid and placing micro-proppant particulates in the microfracture;

(d) providing a proppant slurry, the proppant slurry including a base carrier fluid and a plurality of primary proppant particulates;

(e) pumping the proppant slurry into the subterranean formation at a pressure above the fracture gradient of the formation and placing primary proppant particulates in the primary fracture;

(f) mixing a plurality of micro-proppant particulates with the proppant slurry, wherein the step of mixing micro-proppant particulates with the proppant slurry is initiated at a point before or after the proppant slurry is first pumped into the formation and continues for so long as the proppant slurry is pumped into the formation; and (g) ceasing pumping of the proppant slurry into the subterranean formation thereby causing the pressure at which the proppant slurry is pumped into the formation to fall below the fracture gradient of the formation.

In carrying out the disclosed method, the fracturing fluids, including the pad fracturing fluid and the proppant slurry, can be pumped through the wellbore and through one or more access conduits into the formation. As used herein and in the appended claims, an "access conduit" refers to a passageway that provides fluid communication between the wellbore and the subterranean formation, which may include, but is not limited to, sliding sleeves, open holes (for example, in non-cased areas), hydrajetted holes, perforations (for example, in cased areas), and the like.

The pad fracturing fluid used in the disclosed method includes a base carrier fluid. As used herein and in the appended claims, a "fracturing fluid" means a pad fracturing fluid, a proppant slurry or any other type of treatment fluid pumped into the subterranean formation in a hydraulic formation fracturing operation. As used herein and in the appended claims, a "pad fracturing fluid" means a fracturing fluid that initiates the generation of a fracture in the formation and does not include primary proppant particulates.

The pad fracturing fluid can be pumped into the subterranean formation at a pressure above the fracture gradient of the formation to fracture the formation and form the fracture network (including primary fractures and microfractures) therein in accordance with the disclosed method in any manner known to those skilled in the art of fracturing subterranean formations. As used herein and in the appended claims, the fracture gradient of a formation means the minimum pressure required to create a new fracture or expand an existing fracture in some dimension in the formation.

As used herein and in the appended claims, fracturing the formation means forming a new fracture or expanding an existing fracture in some dimension in the formation. Forming a fracture network in the formation means forming a new fracture network or expanding an existing fracture network in some dimension in the formation. A "fracture network" means the access conduits, primary fractures, branches of primary fractures, microfractures and branches of microfractures, man-made, natural or otherwise, that are within a subterranean formation and in fluid communication with the wellbore. For example, the fracture network may be considered a dendritic fracture network, a shattered fracture network, or any combination thereof.

Figure 2:
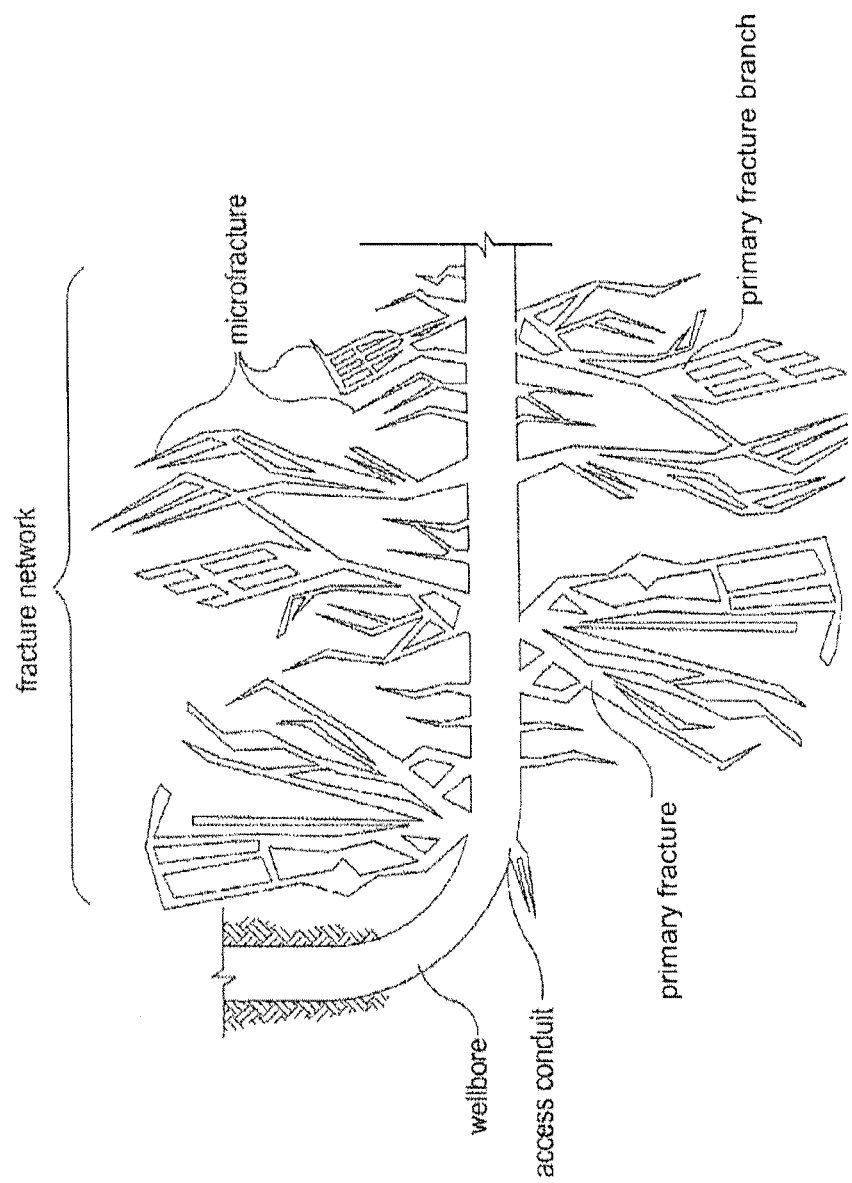
FIG. 2 illustrates a non-limiting example of a shattered fracture network extending from a wellbore into a subterranean formation.

FIG. 1 shows an example of a dendritic fracture network extending from a wellbore into a subterranean formation. FIG. 2 shows an example of a shattered fracture network extending from a wellbore into a subterranean formation. These non-limiting examples illustrate two common types of fracture networks extending from a wellbore. It should be understood that the method disclosed herein is applicable to wellbores at any angle including, but not limited to, vertical wells, deviated wells, highly deviated wells, horizontal wells, and hybrid wells that comprise sections of any combination of the aforementioned wells. For example, the disclosed method may be used in connection with a subterranean formation and wellbore having an existing fracture network.

As used herein and in the appended claims, a primary fracture means a fracture that extends from the wellbore and can be propped open using primary proppant particulates. The primary fracture can be a pre-existing primary fracture or a branch thereof or a new primary fracture or branch thereof that is created by the disclosed method. A microfracture means a natural fracture or an induced secondary fracture that extends from a primary fracture or a branch thereof and that cannot be propped open using primary proppant particulates. The microfracture can be a pre-existing or natural microfracture or a branch thereof or a new microfracture or branch thereof that is created by the disclosed method.

The fracture network is typically formed in a zone of the formation that surrounds the wellbore and propagates from at least one outlet conduit outwardly from the wellbore. Microfractures can exist and be formed in both near-wellbore and far-field regions of the zone, as well as regions located adjacent to branches of primary fractures.

The pad fracturing fluid can be pumped into the formation in stages. The micro-proppant particulates can be mixed with the pad fracturing fluid in accordance with the disclosed method in any one or all of the stages. For example, the micro-proppant particulates can be mixed with the pad fracturing fluid in the initial stage of pumping the pad fracturing fluid into the formation, that is, before the pad fracturing fluid first fractures the formation and forms the fracture network therein. Alternatively, the micro-proppant particulates can be first mixed with the pad fracturing fluid in a subsequent stage of pumping the pad fracturing fluid into the formation, that is, after the pad fracturing fluid first fractures the formation and forms the fracture network therein. For example, it may be desirable for the pad fracturing fluid that is pumped into the formation in the initial stage to be free of proppant particulates of any size. The micro-proppant particulates can be mixed with the aqueous base carrier fluid in any manner known to those skilled in the art with the benefit of this disclosure.

The micro-proppant particulates are placed into the microfracture by pumping the pad fracturing fluid into the formation. For example, due to the hydraulic pressure placed on the formation during the fracturing treatment, the pad fracturing fluid is forced into the microfracture including the fissure openings thereof. While in place, the micro-proppant particulates hold open the microfractures of the fracture network thereby maintaining the ability for fluid to flow through the fracture network to ultimately be produced at the surface.

As used herein and in the appended claims, the term "micro-proppant particulates" means particulates having a D50 particulate size distribution no greater than 30 microns. For example, the micro-proppant particulates can have a D50 particulate size distribution in the range of from about 0.01 microns to about 30 microns or any subset therebetween. For example, the micro-proppant particulates can have a D50 particulate size distribution in the range of from about 1 micron to about 25 microns. For example, the micro-proppant particulates can have a D50 particulate size distribution in the range of from about 5 microns to about 20 microns. As used herein and in the appended claims, a "D50 particle size distribution" means the value of the particle diameter at 50% in the cumulative distribution. For example, the D50 particle size distribution of the micro-proppant particulates mixed with the pad fracturing fluid can be greater than the D50 particle size distribution of the micro-proppant particulates mixed with the proppant slurry. Apart from the above definition of micro-proppant particulates, the modifier "micro" should not be construed as limiting.

As used herein and in the appended claims, the term "primary proppant particulates" means particulates having a D50 particulate size distribution of at least 35 microns. For example, the primary proppant particulates can have a D50 particulate size distribution in the range of from about 35 microns to about 800 microns, or any subset therebetween. For example, the primary proppant particulates can have a D50 particulate size distribution in the range of from about 100 microns to about 500 microns. Apart from the above definition of primary proppant particulates, the modifier "primary" should not be construed as limiting.

For example, the particle size of the micro-proppant particulates used in the disclosed method (for example, the D50 particle size distribution) can be selected to be small enough to mitigate any potential plugging by the micro-proppant particulates as they pass through sand packs formed by the primary proppant particulates. For example, the particle size (for example, the D50 particle size distribution) of the micro-proppant particulates to be used in the disclosed method can be selected to be approximately one third (⅓) of the pore throat diameter corresponding to the size and type of primary proppant particulates to be used in the method in order to prevent the micro-proppant particulates from plugging primary proppant particulate sand packs.

The proppant slurry provided in accordance with the disclosed method includes a base carrier fluid and a plurality of primary proppant particulates. As used herein and in the appended claims, a "proppant slurry" means a treatment fluid that includes primary proppant particulates. The primary proppant particulates can be mixed with the base carrier fluid in any manner known to those skilled in the art with the benefit of this disclosure.

The proppant slurry can be pumped into the subterranean formation at a pressure above the fracture gradient of the formation in accordance with the disclosed method in any manner known to those skilled in the art of fracturing subterranean formations. For example, the pad fracturing fluid pumped into the formation in accordance with the disclosed method can be transitioned to the proppant slurry without ceasing the pumping process or otherwise reducing the hydraulic pressure placed on the formation by the fracturing treatment. As known to those skilled in the art with the benefit of this disclosure, if needed or desired, a pill can be pumped into the formation following pumping of the pad fracturing fluid and prior to pumping of the proppant slurry in order to allow the transition from the pad fracturing fluid to the proppant slurry to be made.

The primary proppant particulates are placed in the primary fracture by pumping the proppant slurry into the formation. For example, due to the hydraulic pressure placed on the formation during the fracturing treatment, the proppant slurry is forced into the primary fracture including any branches thereof. While in place, the primary proppant particulates hold open the primary fracture(s) and branches fracture network thereby maintaining the ability for fluid to flow through the fracture network to ultimately be produced at the surface.

The proppant slurry can be pumped into the formation in stages. The micro-proppant particulates can be mixed with the proppant slurry in any one or all of the proppant slurry stages, so long as micro-proppant particulates are included in the final proppant slurry stage. For example, the micro-proppant particulates can be mixed with the proppant slurry in accordance with the disclosed method throughout the whole time the proppant slurry is pumped into the formation. This assures that any fluid from the proppant slurry that leaks off into the microfracture as the proppant slurry is pumped into the formation or thereafter (for example, after the primary fracture closes on top of the primary proppant particulates) includes micro-proppant particulates. As a result, micro-proppant particulates in the microfracture that are displaced by fluid leaking off from the proppant slurry are replaced with new micro-proppant particulates.

Alternatively, the micro-proppant particulates can be first mixed with proppant slurry in a subsequent stage of pumping the proppant slurry into the formation, that is, after the proppant slurry is first pumped into the formation, as long as micro-proppant particulates are included in the proppant slurry in the final stage of pumping the proppant slurry into the formation, including at the time pumping of the proppant slurry is ceased. Again, this assures that any fluid from the proppant slurry that leaks off into the microfracture as the proppant slurry is pumped into the formation or thereafter (for example, after the primary fracture closes on top of the primary proppant particulates) includes micro-proppant particulates, which in turn assures that any micro-proppant particulates already in the microfracture that are displaced by the leak off fluid are replaced with new micro-proppant particulates.

Ceasing pumping of the proppant slurry into the subterranean formation in accordance with the disclosed method causes the pressure at which the proppant slurry is pumped into the formation to fall below the fracture gradient of the formation. Once the pressure in the formation falls below the fracture gradient of the formation, the primary fracture and any branches thereof tend to close on top of the primary proppant particulates therein causing the base carrier fluid of the proppant slurry to leak off into the microfractures. Again, however, due to the fact that the leak off fluid contains micro-proppant particulates, micro-proppant particulates will continue to remain in the microfractures including the fissure openings thereof allowing the microfractures to remain open and conductive to the flow of hydrocarbons. Including micro-proppant particulates in the final stage of the fracturing fluid treatment (for example, the final stage of the proppant slurry treatment) helps ensure that the microfractures remain open after the fracturing operation is complete. This allows the hydrocarbons to flow through the fracture network to the wellbore and ultimately to the surface where they can be recovered.

For example, the base carrier fluid of the fracturing fluid (including the pad fracturing fluid and the proppant slurry) used in the disclosed method can be an aqueous-based carrier fluid or an oil-based carrier fluid. The aqueous-based carrier fluid or oil-based carrier fluid can include an aqueous-miscible fluid, a water-in-oil emulsion, or an oil-in-water emulsion.

For example, the base carrier fluid of the fracturing fluid (including the pad fracturing fluid and the proppant slurry) used in the disclosed method can be an aqueous-based carrier fluid. For example, the base carrier fluid of the fracturing fluid (including the pad fracturing fluid and the proppant slurry) can be water. The water can come from a variety of sources. For example, the water can be fresh water, saltwater (for example, water containing one or more salts dissolved therein), brine (for example, saturated saltwater or produced water), seawater, brackish water, produced water (for example, water produced from a subterranean formation), formation water, treated flowback water, and mixtures thereof. Generally, the water can be from any source, provided that it does not contain components that might adversely affect the stability and/or performance of the pad fracturing fluid or proppant slurry.

For example, the base carrier fluid of the fracturing fluid (including the pad fracturing fluid and the proppant slurry) used in the disclosed method can be an oil-based carrier fluid. Suitable oil-based carrier fluids include alkanes, olefins, aromatic organic compounds, cyclic alkanes, paraffins, diesel fluids, mineral oils, desulfurized hydrogenated kerosenes, and any combination thereof.

Suitable aqueous-miscible fluids for use in connection with the base carrier fluid of the fracturing fluid (including the pad fracturing fluid and the proppant slurry) used in the disclosed method include alcohols such as methanol, ethanol, n-propanol, isopropanol, n-butanol, sec-butanol, isobutanol, and t-butanol; glycerins; glycols such as polyglycols, propylene glycol, and ethylene glycol; polyglycol amines; polyols; combinations of such compounds with salts such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; and combinations thereof.

Suitable water-in-oil emulsions, also known as invert emulsions, for use in connection with the base carrier fluid of the fracturing fluid (including the pad fracturing fluid and the proppant slurry) used in the disclosed method may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base carrier fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

For example, if needed or desired, the density of the base carrier fluid can be adjusted, for example, to provide additional particulate transport and suspension in the fluid. For example, the pH of the base carrier fluid can be adjusted (for example, by a buffer or other pH adjusting agent), for example, to activate a crosslinking agent and/or to reduce the viscosity of the fluid (for example, to activate a breaker or deactivate a crosslinking agent). For example, the pH may be adjusted to a specific level, which may depend on, among other factors, the types of gelling agents, acids, and other additives included in the base fluid. One of ordinary skill in the art, with the benefit of this disclosure, will recognize when such density and/or pH adjustments are appropriate.

The components of the fracturing fluid, including pad fracturing fluid and the proppant slurry, can be mixed together by any method known to those skilled in the art with the benefit of this disclosure. For example, the pad fracturing fluid, proppant slurry or both can be formed on the site of the wellbore including on the fly as they are pumped into the wellbore and the fracturing treatment is carried out. For example, the micro-proppant particulates and the primary proppant particulates can be incorporated into one or more slurries that are atomized into the pad fracturing fluid and proppant slurry, as appropriate, on the fly as the pad fracturing fluid and proppant slurry are pumped into the wellbore. For example, the micro-proppant particulates can be delivered to the well site in slurry form.

The micro-proppant particulates used in the disclosed method, including the micro-proppant particulates mixed with the pad fracturing fluid and the micro-proppant particulates mixed with the proppant slurry, can be any type of micro-proppant particulate suitable for use in propping open microfractures in subterranean formations as known to those skilled in the art with the benefit of this disclosure. Suitable micro-proppant particulates include all shapes of materials, including substantially spherical materials, low to high aspect ratio materials, fibrous materials, polygonal materials (such as cubic materials), and mixtures thereof. For example, the types of proppant particulates typically used as primary proppant particulates can be used as micro-proppant particulates, except the proppant particulates have a D50 particulate size distribution no greater than 30 microns as set forth above. The micro-proppant particulates can also be generated in the fracturing fluid.

The primary proppant particulates used in the disclosed method, including the primary proppant particulates mixed with the proppant slurry, can be any type of proppant particulate suitable for use in propping open primary fractures and branches thereof in subterranean formations as known to those skilled in the art. Suitable primary proppant particulates include all shapes of materials, including substantially spherical materials, low to high aspect ratio materials, fibrous materials, polygonal materials (such as cubic materials), and mixtures thereof.

Examples of micro-proppant particulates and primary proppant particulates that can be used include sand (for example natural sand), bauxite, ceramic proppant materials, glass materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof. Examples of man-made primary proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

For example, the micro-proppant particulates are selected from the group consisting of silica flour, glass beads, fly ash, ceramics, bauxite, polymer materials, polymeric composites, mica, and combinations thereof. For example, the micro-proppant particulates are selected from the group consisting of silica flour, fly ash, ceramics, polymeric composites and combinations thereof. For example, the micro-proppant particulates are selected from the group consisting of fly ash, ceramics, polymeric composites and combinations thereof. Examples of commercially available micro-proppant particulates that can be used in the disclosed method include micro-proppant particulates manufactured by Zeeospheres Ceramics, LLC and sold as "Zeeospheres N-200" and "Zeeospheres N-600."

For example, the primary proppant particulates can be selected from the group of sand, walnut hulls, resin pre-coated proppant particulates, man-made proppant particulates, and mixtures thereof. For example, the primary proppant particulates of the aqueous based proppant slurry disclosed herein can be natural sand.

For example, the primary proppant particulates can also include degradable materials. Suitable degradable materials include, for example, materials that deform or melt upon heating such as thermoplastic materials, hydrolytically degradable materials, materials degradable by exposure to radiation, materials reactive to acidic fluids, or any combination thereof. For example, the degradable materials can be degraded or degradation of the materials may be initiated by temperature, presence of moisture, oxygen, microorganisms, enzymes, pH, free radicals, a delayed-release acid, such as an acid-releasing degradable material or an encapsulated acid or a treatment fluid subsequently introduced into formation.

Examples of degradable polymers that can be used as the primary proppant particulate in accordance with the method disclosed herein include, but are not limited to, polysaccharides such as cellulose, chitin, chitosan, and proteins. Specific examples include homopolymers and random, block, graft, and star- and hyper-branched aliphatic polyesters. Additional examples of suitable degradable polymers include, but are not limited to, aliphatic polyesters; poly(lactides); poly(glycolides); poly(E-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly(ether esters), polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. The term "derivative" is used herein to include any compound that is made from one of the listed compounds, for example, by replacing one atom in the base compound with another atom or group of atoms.

For example, the primary proppant particulates used in the disclosed method can be aliphatic polyesters such as poly(lactic acid), poly(anhydrides), poly(orthoesters), and poly(lactide)-co-poly(glycolide) copolymers. For example, the primary proppant particulates used in the disclosed method can be formed of poly(lactic acid), poly(orthoesters), and combinations thereof. In choosing an appropriate degradable material, one should consider the degradation products that will result and whether the degradation material will adversely affect other operations or components.

For example, the micro-proppant particulates can be mixed with each of the pad fracturing fluid and the proppant slurry in an amount in the range of from about 0.01 pounds to about 1 pound per gallon of the fluid or slurry. For example, the micro-proppant particulates can be mixed with each of the pad fracturing fluid and the proppant slurry in an amount in the range of from about 0.025 pounds to about 0.5 pounds per gallon of the fluid or slurry. For example, the micro-proppant particulates can be mixed with each of the pad fracturing fluid and the proppant slurry in an amount in the range of from about 0.05 pounds to about 0.2 pounds per gallon of the fluid or slurry.

For example, the concentration of the micro-proppant particulates present in the fracturing fluid (for example, in each of the pad fracturing fluid and the proppant slurry) allows for the formation of a partial monolayer of micro-proppant particulates inside of the microfracture as opposed to a solid pack of multi-layers of micro-proppant particulates inside the microfracture. For example, the concentration of the micro-proppant particulates present in the fracturing fluid (for example, in each of the pad fracturing fluid and the proppant slurry) can be no greater than the critical bridging concentration of the micro-proppant particulates in the subterranean formation. By assuring that the concentration of the micro-proppant particulates in the proppant slurry is sufficiently low, the micro-proppant particulates will not undermine or plug the pore spaces of the proppant pack.

For example, the primary proppant particulates can be mixed with the base carrier fluid to form the proppant slurry in an amount in the range of from about 0.01 pounds to about 6 pounds per gallon of the slurry. For example, the primary proppant particulates can be mixed with the base carrier fluid to form the proppant slurry in an amount in the range of from about 0.01 pounds to about 1 pound per gallon of the slurry. For example, primary proppant particulates can be mixed with the base carrier fluid to form the proppant slurry in an amount in the range of from about 0.025 pounds to about 0.1 pounds per gallon of the slurry.

As known to those skilled in the art with the benefit of this disclosure, various additional components and additives can be included in the pad fracturing fluid and proppant slurry in order to, for example, reduce pumping friction, make it easier to pump the fluids through the wellbore and into the formation, reduce or eliminate the fluid's reaction to the formation, enhance the ability of the fluids to fracture the formation and keep the fractures open during and following the fracturing treatment, enhance the ability of the fluids to place the proppant particulates (including the micro-proppant particulates and the primary proppant particulates) in the fractures, and make it easier to remove the fluids and any broken down gels and the like from the formation once the fracturing treatment is complete.

For example, both the pad fracturing fluid and the proppant slurry used in the disclosed method can include a friction reducing agent. Examples of friction reducing agents that can be used include polysaccharides, polyacrylamides and combinations thereof.

For example, in order to facilitate consolidation of the primary proppant particulates in the primary fracture in accordance with the method disclosed herein, the primary proppant particulates can be coated with a consolidating agent, and the disclosed method can further comprise the step of allowing the primary proppant particulates to consolidate in the primary fracture. The micro-proppant particulates used in the pad fracturing fluid, the proppant slurry or both the pad fracturing fluid and the proppant slurry can also be coated with a consolidating agent, and the disclosed method can further comprise the step of allowing the micro-proppant particulates to consolidate in the microfracture.

As used herein and in the appended claims, "coated with a consolidating agent" means partially coated or fully coated with the consolidating agent. Any portion of the proppant particulates as a whole may be coated with a consolidating agent. The term "coating" and the like does not imply any particular degree of coating on the proppant particulates. In particular, the terms "coat" or "coating" do not imply 100% coverage by the coating on the particulates. For example, at least a majority of the proppant particulates can be at least partially coated with a consolidating agent and allowed to consolidate in-situ within the formation to form a hardenable permeable or impermeable mass. The consolidating agent enhances the effectiveness of the proppant particulates in propping open the fracture and prevents the proppant particulates from flowing back into the wellbore. For example, the primary proppant particulates are typically consolidated into a proppant pack within the fracture. As used herein and in the appended claims, the term "proppant pack" refers to a collection of proppant particulates consolidated together within a fracture.

Any type of consolidating agent that will enable the proppant particulates to consolidate within a fracture in the formation can be used. For example, the proppant particulates can be either pre-coated with the consolidating agent or coated with the consolidating agent on the fly as the proppant slurry (or the pad fluid in the event the micro-proppant particulates in the pad fluid are coated with a consolidating agent) is formed and pumped into the wellbore.

Consolidating agents suitable for use in the disclosed method generally comprise any compound that is capable of minimizing particulate migration. For example, the consolidating agent can be selected from the group consisting of a curable resin, a tackifying agent, and mixtures thereof. For example, the consolidating agent can be a curable resin. For example, the curable resin can be selected from the group consisting of epoxies, furans, phenolics, furfuryl aldehydes, furfuryl alcohols, and mixtures thereof. For example, the consolidating agent can be selected from the group consisting of epoxies, furans, phenolics, and mixtures thereof. For example, the consolidating agent can be a tackifying agent. For example, the tackifying agent can be selected from the group consisting of polyamides, polyesters, polycarbonates, natural resins, zeta-potential reducing agents, and mixtures thereof. For example, the tackifying agent can be selected from the group consisting of polyamides, polyesters, polycarbonates, and mixtures thereof.

Examples of commercially available consolidating agents that can be used include SANDWEDGE® (an adhesive substance, available from Halliburton Energy Services, Inc.) and EXPEDITE® (a two-component resin system, available from Halliburton Energy Services, Inc.). The type and amount of consolidating agent to be used may depend upon, among other factors, the composition and/or temperature of the subterranean formation, the chemical composition of formation fluids, the flow rate of fluids present in the formation, the effective porosity and/or permeability of the subterranean formation, the pore throat size and distribution associated with the formation, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to use in coating the proppant particulates used in the disclosed method to achieve the desired results.

For example, the consolidating agent can be used to facilitate the consolidation of the primary proppant particulates into a proppant pack in the primary fracture. For example, the size and nature of the proppant pack can vary depending, in part, upon the specific consolidating agent used and the size of the primary proppant particulates. In wells with, or projected to have high production flow rates, for example, a curable resin may be desirable for use as the consolidating agent to prevent any potential break up of the proppant mass. For example, in wells with or projected to have low production flow rates, it may be desirable to use a tackifying agent as the consolidating agent. In one embodiment, a portion of the primary proppant particulates used in the proppant slurry are coated with a curable resin, as stated above, and a portion of the primary proppant particulates used in the proppant slurry are coated with a tackifying agent, as stated above.

For example, the primary proppant particulates initially used in the treatment (for example, early in the proppant stage of a fracturing treatment) can be coated with a tackifying agent. At some point during the treatment (for example, the tail-end stage of a fracturing treatment), the primary proppant particulates used can be coated with a curable resin. In another embodiment, the primary proppant particulates can be intermittently coated with a curable resin or a tackifying agent as the proppant slurry is injected into the formation on the fly.

The proppant particulates (including the primary proppant particulates and micro-proppant particulates when they are coated with a consolidating agent) can be allowed to consolidate in the fracture by allowing a sufficient time for the consolidating agent to act (and a proppant pack to form, for example) before the fracture is allowed to close. For example, if a curable resin is used as the consolidating agent, it functions to consolidate proppant particulates and hold them together within the fracture as it hardens and cures within the fracture. If a tackifying agent is used, it causes the proppant particulates to cling together within the fracture. For example, by consolidating the primary proppant particulates, one or more proppant packs can be formed which can help prevent flow back of proppant particulates into the wellbore. As used herein and in the appended claims, a "proppant pack" means a collection of proppant particulates in a fracture network.

For example, the proppant slurry can further include a cross-linkable gelling agent, a cross-linker and a gel breaker, and the proppant slurry can be pumped into the subterranean formation in a manner such that the gelling agent cross-links to form a cross-linked gel and increase the viscosity of the proppant slurry in the formation. If a cross-linkable gel is used, the disclosed method further comprises the steps of allowing the cross-linked gel to break down, thereby decreasing the viscosity of the proppant slurry, and flowing back the well to remove the broken gel in the proppant slurry from the fracture.

The cross-linkable gelling agent and cross-linker can be any cross-linkable gelling agent and cross-linker known to those skilled in the art to form a cross-linked gel in fracturing fluids and thereby enhance the viscosity of the fluids in the formation. For example, the cross-linkable gelling agent gels the base aqueous fluid in the proppant slurry and thereby increases its viscosity. For example, the cross-linker functions to cross link the gel and thereby further increase the viscosity of the base fluid. For example, the increased viscosity of the base fluid allows the base fluid to transport higher quantities of primary particulate material. Individuals skilled in the art, with the benefit of this disclosure, will recognize the exact types and amounts of cross-linkable gelling agent and cross-linker to use, depending on factors such as the specific components used, the desired viscosity, and formation conditions.

A variety of cross-linkable gelling agents can be used, including biopolymers, synthetic polymers, or a combination thereof. Examples of suitable cross-linkable gelling agents include hydratable polymers that contain one or more functional groups, such as hydroxyl, carboxyl, sulfate, sulfonate, amino, amide, phosphate, phosphonate, amino, and amide groups. Additional examples of suitable cross-linkable gelling agents include biopolymers that include polysaccharides or derivatives thereof that contain one or more of the following monosaccharide units: galactose, mannose, glucoside, glucose, xylose, arabinose, fructose, glucuronic acid, and pyranosyl sulfate. Additional examples of suitable polymers that can be used as the cross-linkable gelling agents include, but are not limited to, xanthan gum, guar gum and derivatives thereof (such as hydroxypropyl guar and carboxymethylhydroxypropyl guar), and cellulose derivatives (such as hydroxyethyl cellulose). Additionally, synthetic polymers and copolymers that contain the above-mentioned functional groups can be used. Examples of such synthetic polymers include, but are not limited to, polyacrylate, polymethacrylate, polyacrylamide, polyvinyl alcohol, and polyvinylpyrrolidone. As a further example, the cross-linkable gelling agent molecule may be depolymerized. The term "depolymerized," as used herein, generally refers to a decrease in the molecular weight of the gelling agent molecule.

For example, the cross-linkable gelling agent can be added to the proppant slurry in an amount in the range of from about 0.1% to about 5% by weight, based on the weight of the water in the proppant slurry. For example, the cross-linkable gelling agents can be added to the proppant slurry in an amount in the range of from about 0.01% to about 2% by weight, based on the weight of the water in the proppant slurry.

Similarly, a variety of cross-linkers can be used. The cross-linker functions to crosslink the cross-linkable gelling agent in the proppant slurry to form a cross-linked gel in the proppant slurry. Suitable cross-linkers comprise at least one metal ion that is capable of crosslinking the cross-linkable gelling agent. Examples include, but are not limited to, borate compounds (such as, for example, alkaline earth metal borates, alkali metal-alkaline earth borates, and mixtures thereof); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; and combinations thereof. Further examples of suitable borate compounds include probertite, ulexite, nobleite, frolovite, colemanite, calcined colemanite, priceite, paternoite, hydroboracite, kaliborite, and other similar borates. For example, of the various slightly water-soluble borate compounds that can be used, colemanite, calcined colemanite, and ulexite are good examples. An example of a suitable commercially available borate-based crosslinker is "BC-140™," a crosslinker available from Halliburton Energy Services, Inc. of Duncan, Okla. An example of a suitable commercially available zirconium-based crosslinker is "CL-24™," a crosslinker available from Halliburton Energy Services, Inc. of Duncan, Okla. An example of a suitable commercially available titanium-based crosslinking agent is "CL-39™," crosslinking agent available from Halliburton Energy Services, Inc. of Duncan, Okla.

For example, the cross-linker can be added to the proppant slurry in an amount sufficient to provide, inter alia, the desired degree of crosslinking between the cross-linkable gelling agent molecules. For example, the cross-linker can be added to the proppant slurry in an amount in the range from about 0.001% to about 10% by weight, based on the weight of the water in the proppant slurry. For example, the cross-linker can be added to the proppant slurry in an amount in the range from about 0.01% to about 1% by weight, based on the weight of the water in the proppant slurry.

The gel breaker can be any gel breaker known to those skilled in the art to break a cross-linked gel formed in fracturing fluids and thereby decrease the viscosity of the fluids in the formation. Any suitable gel breaker can be used, including encapsulated gel breakers and internal delayed gel breakers, such as enzyme, oxidizing, acid buffer, or temperature-activated gel breakers. The gel breakers cause the viscous aqueous base carrier fluid of the proppant slurry to revert to a lower viscosity fluid that can be produced back to the surface after the proppant slurry has been used to place the particulates in the fractures.

For example, the gel breaker can be added to the proppant slurry in an amount in the range of from about 0.5% to about 10% by weight, based on the weight of the cross-linkable gelling agent. The gel breaker breaks the cross-linked gel into a linear gel or a water-like fluid.

The cross-linked gel formed in the proppant slurry is allowed to break down thereby decreasing the viscosity of the proppant slurry in the formation by allowing sufficient time for the gel breaker in the proppant slurry to break the gel and the gel to be broken down. The well can be flowed back to remove broken gel in the proppant slurry from the formation by any manner understood by those skilled in the art with the benefit of this disclosure. For example, the initial stage of production can be carried out in increasing step rates.

For example, the pad fracturing fluid, proppant slurry or both used in the method disclosed herein can be foamed or include a wet gas. Foamed fluids and fluids that include wet gases may minimize the exposure of the subterranean formation to the aqueous base carrier fluid, which for some tight formations (including shale formations) advantageously minimizes the deleterious effects that water can have on the formation faces (for example, clay swelling). Foamed fluids and fluids that include wet gases may also, in some embodiments, be capable of helping to suspend the micro-proppant particulates in the base aqueous fluid.

Examples of gases suitable for use in conjunction with the pad fracturing fluid and proppant slurry include, but are not limited to, nitrogen, carbon dioxide, air, methane, helium, argon, and any combination thereof. One skilled in the art, with the benefit of this disclosure, will understand the benefit of each gas. For example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 pounds of proppant per gallon of fracture fluid if necessary.

The foamed fluid can have a foam quality in the range from any lower limit to any upper limit and encompass any subset therebetween. For example, the quality of the foamed fluid can range from a lower limit of about 5%, 10%, 25%, 40%, 50%, 60%, or 70% gas volume to an upper limit of about 95%, 90%, 80%, 75%, 60%, or 50% gas volume. For example, the foamed treatment fluid may have a foam quality from about 85% to about 95%, or about 92% to about 95%.

Examples of suitable foaming agents that can be used in conjunction with the pad fracturing fluid and proppant slurry include, but are not limited to, cationic foaming agents, anionic foaming agents, amphoteric foaming agents, nonionic foaming agents, or any combination thereof. Examples of suitable foaming agents can include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, derivatives of such compounds and any combination thereof. For example, the foaming agent can be included in the foamed fluid at a concentration in the range of from about 0.05 to about 2 percent by volume based on the volume of the liquid component in the fluid (for example, from about 0.5 to about 20 gallons foaming agent per 1000 gallons of liquid).

Additional additives that can be included in the pad fracturing fluid and proppant slurry used in the disclosed method include, but are not limited to, hydrocarbon fluids, air, salts, weighting agents, inert solids, fluid loss control agents, emulsifiers, dispersion aids, corrosion inhibitors, emulsion thinners, emulsion thickeners, viscosifying agents, surfactants, lost circulation materials, pH control additives, breakers, biocides, stabilizers, chelating agents, scale inhibitors, mutual solvents, oxidizers, reducers, clay stabilizing agents, and any combination thereof. For example, it may be advantageous to include a clay stabilizing agent in the pad fracturing fluid and/or proppant slurry in order to minimize clay swelling.

Although the disclosed method can be used in any subterranean formation capable of being fractured, it is particularly suitable in formations where microfractures are more prevalent. For example, such formations include, but are not limited to, formations with at least a portion of the formation characterized by very low permeability, very low formation pore throat size, high closure pressure, high brittleness index, or any combination thereof.

For example, at least a portion of the subterranean formation may have a permeability ranging from a lower limit of about 0.1 nanodarcy (nD), 1 nD, 10 nD, 25 nD, 50 nD, 100 nD, or 500 nD to an upper limit of about 10 microdarcies (mD), 1 mD, 500 mD, 100 mD, 10 mD, or 1 mD, and wherein the permeability may range from any lower limit to any upper limit and encompass any subset therebetween. For example, at least a portion of the subterranean formation may have a permeability of no greater than 1 mD. One method to determine the subterranean formation permeability includes The American Petroleum Institute Recommended Practice 40, "Recommended Practices for Core Analysis," Second Edition, February 1998.

For example, at least a portion of the subterranean formation may have an average formation pore throat size ranging from a lower limit of about 0.005 microns, 0.01 microns, 0.05 microns, 0.1 microns, 0.25 microns, or 0.5 microns to an upper limit of about 2.0 microns, 1.5 microns, 1.0 microns, or 0.5 microns, and wherein the average formation pore throat size may range from any lower limit to any upper limit and encompass any subset therebetween. One method to determine the pore throat size of a subterranean formation includes the AAPG Bulletin, March 2009, v. 93, no. 3, pages 329-340.

For example, at least a portion of the subterranean formation may have a closure pressure greater than about 500 psi to an unlimited upper limit. While the closure pressure upper limit is believed to be unlimited, formations where the disclosed method may be applicable include formations with a closure pressure ranging from a lower limit of about 500 psi, 1000 psi, 1500 psi, or 2500 psi to an upper limit of about 20,000 psi, 15,000 psi, 20 10,000 psi, 8500 psi, or 5000 psi, and wherein the closure pressure may range from any lower limit to any upper limit and encompass any subset therebetween. One method to determine the subterranean formation closure pressure includes the method presented in Society for Petroleum Engineers paper number 60321 entitled "Case History: Observations From Diagnostic Injection Tests in Multiple Pay Sands of the Mamm Creek Field, Piceance Basin, Colo."

For example, at least a portion of a subterranean formation may have a brittleness index ranging from a lower limit of about 5, 10, 20, 30, 40, or 50 to an upper limit of about 150, 125, 100, or 75 and wherein the brittleness index may range from any lower limit to any upper limit and encompass any subset therebetween. Brittleness is a composite of Poisson's ratio and Young's modulus. One method to determine the brittleness index of a subterranean formation includes the method presented in Society for Petroleum Engineers paper number 132990 entitled "Petrophysical Evaluation of Enhancing Hydraulic Stimulation in Horizontal Shale Gas Wells."

The method disclosed herein is particularly suitable for fracturing tight formations of unconventional reservoirs, such as formations containing shale, tight sandstone formations, coal bed formations and other formations that encounter high closure stresses. For example, the method disclosed herein can be used to fracture a shale zone of a subterranean formation.

For example, all or part of the wellbore penetrating the subterranean formation may include casing pipes or strings placed in the wellbore (a "cased hole" or a "partially cased hole"), in order to, among other purposes, facilitate production of fluids out of the formation and through the wellbore to the surface. For example, the wellbore may also be an "open hole" that has no casing.

For example, the method disclosed herein may be used in conjunction with zipper fracture techniques. Zipper fracture techniques use pressurized fracture networks in at least one wellbore to direct the fracture network of a second, nearby wellbore. Because the first fracture network is pressurized and exerting a stress on the subterranean formation, the second pressure network may extend through the path of least resistance, i.e., the portions of the subterranean formation under less stress. Continuing to hold open portions of the fracture network with proppant particulates may continue to provide stress on the subterranean formation even with a reduced fluid pressure therein. Therefore, enhancing the propping of more of the fracture network including microfractures may enhance efficacy of a zipper fracture technique. For example, the method described herein may be implemented in at least one wellbore to enhance a proximal fracture network of at least one nearby wellbore. As used herein the term "proximal" when referring to multiple fracture networks refers to fracture networks in close enough proximity that the formation stresses caused by propping one of the fracture networks impact the structure of a second fracture network.

In accordance with the disclosed method, complex fracture networks, including primary fractures, microfractures and branches, can be propped with proppant particulates and advantageously enhance the amount of hydrocarbons that can be produced from a subterranean formation after the fracturing treatment is complete. By including micro-proppant particulates in at least the final stage of the proppant slurry treatment, the fact that micro-proppant particulates may be pushed deep into the microfractures by leak off fluid from the proppant slurry is not a big detriment to the overall treatment. Only a relatively small amount of micro-proppant particulates (compared to the amount of primary proppant particulates) is required. The method helps ensure that microfractures and openings thereof (natural microfractures and induced microfractures) that interconnect with the primary fractures remain open.

Figure 3:
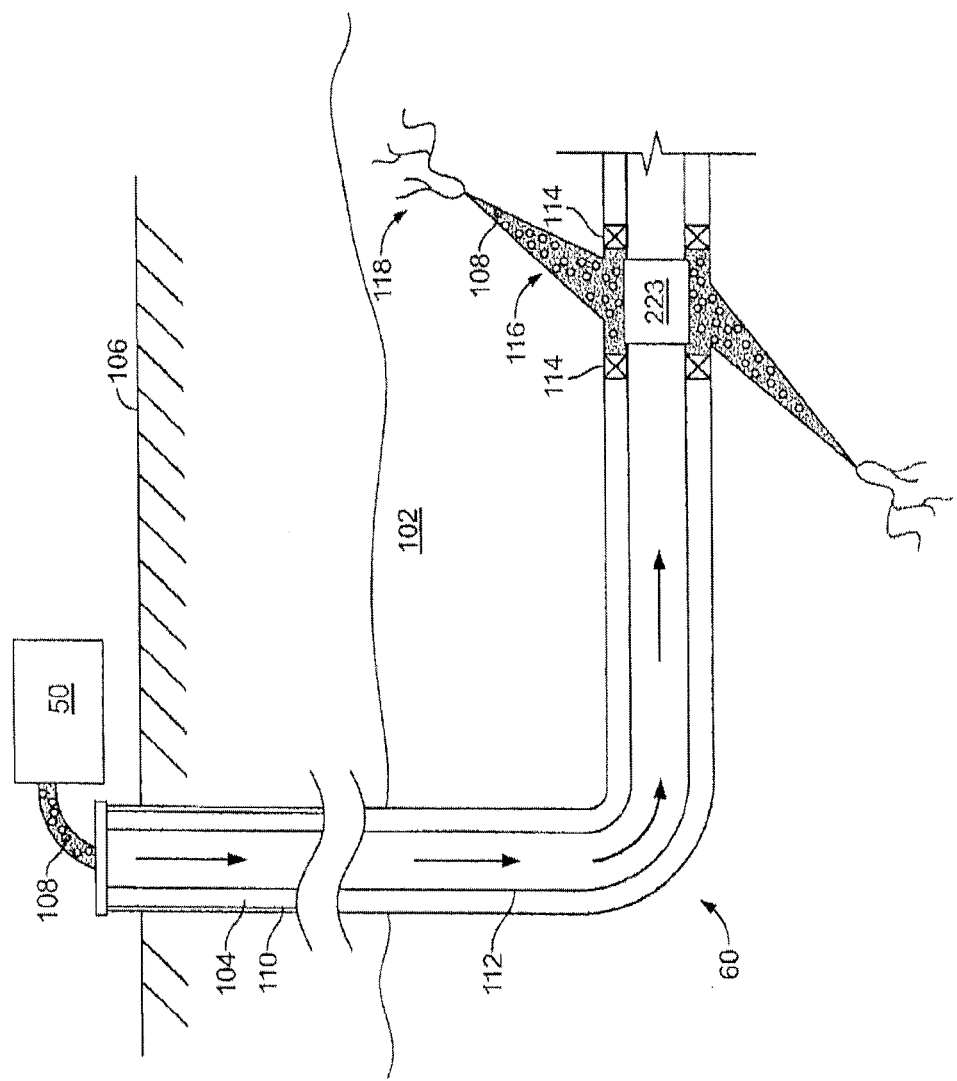
FIG. 3 is a diagram illustrating an example of a fracturing system that can be used in accordance with certain embodiments of the present disclosure.
Figure 4:
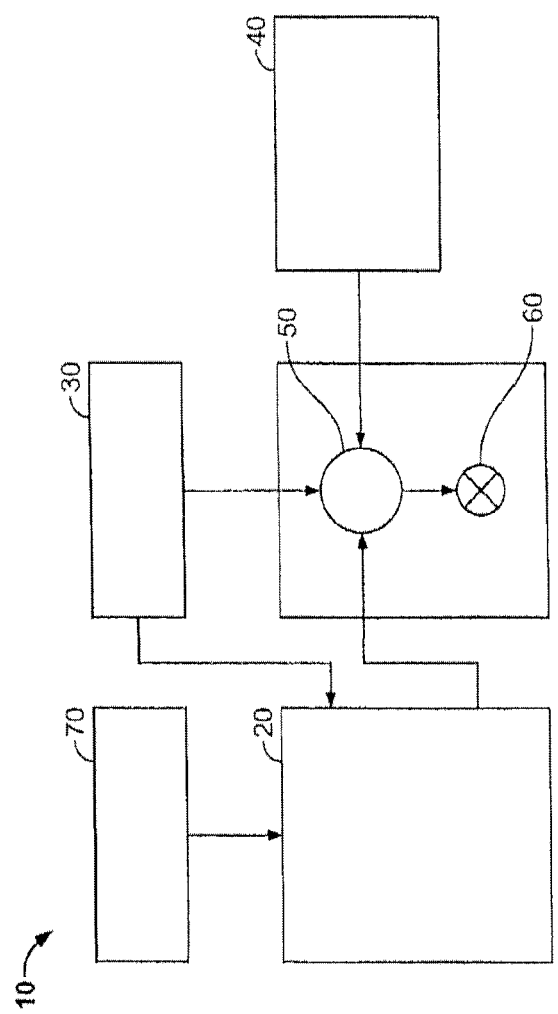
FIG. 4 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 3 and 4 illustrate a typical fracturing operation.

For example, and with reference to FIG. 3, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing the pad fracturing fluid and proppant slurry used in the disclosed method), a fluid source 30, a proppant source 40, and a pump and blender system 50. The system 10 resides at the surface at a well site where a well 60 is located. For example, the fracturing fluid producing apparatus 20 can combine a gel pre-cursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that provides one or more additives (e.g., gelling agents, weighting agents, and/or other optional additives as discussed above) to alter the properties of the fracturing fluid (for example, the pad fluid and/or proppant slurry). For example, the other additives 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particulates, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on the fly" methods. Thus, for example, the pumping and blender system 50 can provide just fracturing fluid (for example, the pad fluid) into the well at some times, just proppant slurry at some times, just proppant particulates at other times, and combinations of those components at yet other times.

FIG. 4 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the working string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 4 shows two packers 114, one defining an uphole boundary of the interval and one defining the downhole end of the interval.

When the fracturing fluid 108 (for example, the pad fracturing fluid) is introduced into wellbore 104 (e.g., in FIG. 4, the area of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid 108 (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

Table 1 below shows the particle mesh sizes and D50 particle size distributions of various small sized natural sands that can be used as primary proppant particulates in accordance with the disclosed method. Table 1 also shows the pore throat diameter of proppant packs formed with each size of sand.

TABLE 1

D50 Particle Size Distribution and Pore Throat Diameter

| Sand (U.S. Standard Mesh) | D50 (mm) | Pore Throat Diameter (μm) |
|---|---|---|
| 50/70 | 0.2540 | 38.1 |
| 40/60 | 0.3556 | 55.9 |
| 30/50 | 0.4318 | 66.0 |

Micro-proppant particulates manufactured by Zeeospheres Ceramics, LLC and sold as "Zeeospheres N-200" and "Zeeospheres N-600" were evaluated to determine if they can successfully migrate or produce through the 30/50 mesh sand pack set forth in Table 1. The D50 and D90 particle size distribution of these micro-proppant particulates are set forth in Table 2 below.

TABLE 2

D50 and D90 of Zeeospheres N-200 and N-600 Micro-proppant Particulates

| | D50 (μm) | D90 (μm) |
|---|---|---|
| N-200 | 5 | 12 |
| N-600 | 10 | 25 |

In each test, an aqueous solution containing 0.1 lb/gal of the corresponding micro-proppant particulate was prepared by mixing 6 grams of the micro-proppant particulate in 500 mL of tap water. Brady sand of 30/50 mesh was hand-packed into a brass flow cell with an 80 mesh (U.S. Standard Mesh) wired screen installed at the bottom of the flow cell.

Approximately 250 mL of tap water was first injected through the sand pack at a flow rate of 50 mL/min using a peristaltic pump. The corresponding micro-proppant particulate was then injected in the sand pack at the same rate and in the same manner.

In each test, fluid samples containing the corresponding micro-proppant particulate before injection into the sand pack and after exiting the sand pack were evaluated, and it was determined that the corresponding micro-proppant particulate successfully passed through the sand pack.

Thus, the results of the tests show that fluid leak off from an aqueous based proppant slurry used to form a sand pack in a primary fracture of a subterranean formation can successfully deliver micro-proppant particulates through the sand pack and into microfractures extending from the primary fracture.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of or" consist of the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of fracturing a subterranean formation, comprising:
   (a) providing a fracturing fluid, said fracturing fluid including a base carrier fluid;
   (b) pumping said fracturing fluid into the subterranean formation at a pressure above the fracture gradient of the formation to fracture the formation and form a fracture network therein that includes at least one primary fracture and at least one microfracture;
   (c) mixing a plurality of micro-proppant particulates with said fracturing fluid and placing micro-proppant particulates in said microfracture;
   (d) mixing a plurality of primary proppant particulates with said fracturing fluid and placing primary proppant particulates in said primary fracture, wherein said step of mixing said micro-proppant particulates with said fracturing fluid is initiated at a point before or after said fracturing fluid is first pumped into said formation but before primary proppant particulates are mixed with said fracturing fluid such that fracturing fluid containing micro-proppant particulates is pumped into said subterranean formation prior to said step of mixing said plurality of primary proppant particulates with said fracturing fluid and wherein said step of mixing micro-proppant particulates with said fracturing fluid continues for so long as said primary proppant particulates are mixed with said fracturing fluid and said fracturing fluid and primary proppant particulates are pumped into the formation, wherein said steps (b), (c) and (d) result in said micro-proppant particulates holding open said microfracture and said primary proppant particulates holding open said primary fracture such that fluid flow through said fracture network is enhanced without plugging of primary-proppant particle packs in said fracture network; and
   (e) ceasing pumping of said fracturing fluid into the subterranean formation thereby causing the pressure at which said fracturing fluid is pumped into the foimation to fall below said fracture gradient of the formation.

2. The method of claim 1, wherein said base carrier fluid of said fracturing fluid is an aqueous-based carrier fluid.

3. The method of claim 1, wherein said micro-proppant particulates have a D50 particulate size distribution no greater than 30 microns.

4. The method of claim 1, wherein said micro-proppant particulates are selected from the group consisting of silica flour, glass beads, fly ash, ceramics, bauxite, polymer materials, polymeric composites, mica, and combinations thereof.

5. The method of claim 1, wherein said primary proppant particulates have a D50 particulate size distribution of at least 35 microns.

6. The method of claim 1, wherein said primary proppant particulates are selected from the group consisting of sand, walnut hulls, resin pre-coated proppant particulates, man-made proppant particulates, and mixtures thereof.

7. The method of claim 1, wherein said micro-proppant particulates are mixed with said fracturing fluid in an amount in the range of from about 0.01 pounds to about 1 pound per gallon of said fluid.

8. The method of claim 1, wherein said primary proppant particulates are mixed with said fracturing fluid in an amount in the range of from about 0.01 pounds to about 6 pounds per gallon of said fluid.

9. A method of fracturing a subterranean formation, comprising:
   (a) providing a pad fracturing fluid, said pad fracturing fluid including a base carrier fluid and does not include primary proppant particulates;
   (b) pumping said pad fracturing fluid into the subterranean formation at a pressure above the fracture gradient of the formation to fracture the formation and form a fracture network therein that includes at least one primary fracture and at least one microfracture;
   (c) mixing a plurality of micro-proppant particulates with said pad fracturing fluid and placing micro-proppant particulates in said microfracture;
   (d) providing a proppant slurry, said proppant slurry including a base carrier fluid and a plurality of primary proppant particulates;
   (e) pumping said proppant slurry into the subterranean formation at a pressure above the fracture gradient of the formation and placing primary proppant particulates in said primary fracture;
   (f) mixing a plurality of micro-proppant particulates with said proppant slurry, wherein said step of mixing micro-proppant particulates with said proppant slurry is initiated at a point before or after said proppant slurry is first pumped into said formation and continues for so long as said proppant slurry is pumped into said formation, wherein said steps Lb), (c), (d), (e) and (f) result in said micro-proppant particulates holding open said microfracture and said primary proppant particulates holding open said primary fracture such that fluid flow through said fracture network is enhanced without plugging of primary-proppant particle packs in said fracture network; and
   (g) ceasing pumping of said proppant slurry into the subterranean formation thereby causing the pressure at which said proppant slurry is pumped into the formation to fall below said fracture gradient of the formation.

10. The method of claim 9, wherein said base carrier fluid of said pad fracturing fluid and said proppant slurry is an aqueous-based carrier fluid.

11. The method of claim 9, wherein said micro-proppant particulates have a D50 particulate size distribution no greater than 30 microns.

12. The method of claim 9, wherein said D50 particle size distribution of said micro-proppant particulates mixed with said pad fracturing fluid is greater than the D50 particle size distribution of said micro-proppant particulates mixed with said proppant slurry.

13. The method of claim 9, wherein said micro-proppant particulates are selected from the group consisting of silica flour, glass beads, fly ash, ceramics, bauxite, polymer materials, polymeric composites, mica, and combinations thereof.

14. The method of claim 9, wherein said primary proppant particulates have a D50 particulate size distribution of at least 35 microns.

15. The method of claim 9, wherein said primary proppant particulates are selected from the group consisting of sand, walnut hulls, resin pre-coated proppant particulates, man-made proppant particulates, and mixtures thereof.

16. The method of claim 9, wherein said micro-proppant particulates are mixed with each of said pad fracturing fluid and said proppant slurry in an amount in the range of from about 0.01 pounds to about 1 pound per gallon of said fluid or slurry.

17. The method of claim 9, wherein said primary proppant particulates are mixed with said proppant slurry in an amount in the range of from about 0.01 pounds to about 6 pounds per gallon of said slurry.

18. The method of claim 9, wherein said primary proppant particulates are coated with a consolidating agent, and said method further comprises:
   allowing said primary proppant particulates to consolidate in said fracture.

19. The method of claim 9, wherein said proppant slurry further includes a cross-linkable gelling agent, cross-linker and gel breaker, wherein said proppant slurry is also pumped into the formation in a manner such that said gelling agent cross-links and increases the viscosity of said proppant slurry, and wherein said method further comprises:
   allowing said cross-linked gel to break down thereby decreasing the viscosity of said proppant slurry; and
   flowing back the well to remove broken gel in said proppant slurry from the formation.

20. The method of claim 9, wherein said subterranean formation includes at least one portion that has a permeability no greater than 1 mD.

21. The method of claim 9, wherein said subterranean formation includes a shale zone.

22. The method of claim 9, further comprising forming said proppant slurry using mixing equipment to combine said base carrier fluid and said plurality of primary proppant particulates.

\* \* \* \* \*